United States Patent
Park

(10) Patent No.: US 9,432,203 B2
(45) Date of Patent: Aug. 30, 2016

(54) METHOD AND APPARATUS FOR DYNAMICALLY CONFIGURING MULTICAST AND BROADCAST SERVICE (MBS) ZONE IN WIRELESS COMMUNICATION SYSTEM

(75) Inventor: Dae-Geun Park, Daejeon-si (KR)

(73) Assignee: Electronics and Telecommunications Research Institute, Daejeon-si (KR)

( * ) Notice: Subject to any disclaimer, the term of this patent is extended or adjusted under 35 U.S.C. 154(b) by 925 days.

(21) Appl. No.: 13/548,336

(22) Filed: Jul. 13, 2012

(65) Prior Publication Data

US 2013/0021961 A1   Jan. 24, 2013

(30) Foreign Application Priority Data

Jul. 22, 2011   (KR) .......................... 10-2011-0073198

(51) Int. Cl.
*H04H 20/71* (2008.01)
*H04W 88/00* (2009.01)
*H04L 12/18* (2006.01)
*H04W 72/00* (2009.01)

(52) U.S. Cl.
CPC ........... *H04L 12/185* (2013.01); *H04L 12/189* (2013.01); *H04L 12/1877* (2013.01); *H04W 72/005* (2013.01)

(58) Field of Classification Search
CPC ... H04W 4/06; H04W 72/005; H04W 48/08; H04W 76/002; H04W 48/16; H04L 12/185; H04L 12/1845; H04L 12/1877; H04N 21/6131; H04N 21/41407
See application file for complete search history.

(56) References Cited

U.S. PATENT DOCUMENTS

| | | | |
|---|---|---|---|
| 2009/0175183 A1* | 7/2009 | Mochizuki et al. | 370/252 |
| 2009/0323634 A1* | 12/2009 | Kim et al. | 370/331 |
| 2010/0029233 A1* | 2/2010 | Chu | 455/186.1 |
| 2010/0061289 A1* | 3/2010 | Mun et al. | 370/312 |
| 2011/0292859 A1* | 12/2011 | So et al. | 370/312 |

FOREIGN PATENT DOCUMENTS

KR   10-2009-0039223 A   4/2009

OTHER PUBLICATIONS

Ji Hoon Lee et al., Reducing Handover Delay by Location Management in Mobile WiMAX Multicast and Broadcast Services, IEEE Transactions on Vehicular Technology, Feb. 2011, pp. 605-617, vol. 60, Issue No. 2.

* cited by examiner

*Primary Examiner* — Awet Haile
(74) *Attorney, Agent, or Firm* — William Park & Associates Ltd.

(57) ABSTRACT

Provided are a method and apparatus for configuring a Multicast and Broadcast Service (MBS) zone dynamically in a mobile communication environment. According to an example, there is provided a method of seamlessly changing base stations configuring a MBS zone whenever one or more mobile terminals configuring the MBS zone move or whenever a predetermined time period has elapsed to thereby provide a MBS with excellent quality while saving radio resources.

9 Claims, 8 Drawing Sheets

MBS ZONE A

MBS ZONE B

MBS ZONE A

MBS ZONE B

METHOD AND APPARATUS FOR DYNAMICALLY CONFIGURING MULTICAST AND BROADCAST SERVICE (MBS) ZONE IN WIRELESS COMMUNICATION SYSTEM

CROSS-REFERENCE TO RELATED APPLICATION

This application claims the benefit under 35 U.S.C. §119 (a) of a Korean Patent Application No. 10-2011-0073198, filed on Jul. 22, 2011, the entire disclosure of which is incorporated herein by reference for all purposes.

BACKGROUND

1. Field

The following description relates to a mobile communication service, and more particularly, to a technique for configuring a broadcasting zone to provide a broadcasting service.

2. Description of the Related Art

A broadcast service is one of representative wireless communication services. Generally, the broadcast service is serviced in a unicast manner meaning 1:1 data transmission between a broadcast server and a subscriber (or a mobile terminal), or in a multicast and broadcast manner meaning 1:N data transmission between a broadcast server and subscribers. The wireless communication services are expensive than wired communication services due to limitation of resource amount allocatable to subscribers. In order to provide a plurality of users with a broadcast service through a mobile communication system, a multicast and broadcast service (hereinafter, simply referred to as a MBS) which can transmit broadcast content to a plurality of users through a single resource has been used.

The IEEE802.16e, IEEE802.16m, 3GPP/LTE, and WiMAX Forum have suggested MBSs named E-MBS (Enhanced-MBS), MBMS (Multicast Broadcast Multimedia Service), E-MBMS (Enhanced-MBMS), and MCBCS (MultiCast BroadCast Service).

According to the IEEE802.16e and IEEE802.16m, all base stations grouped into a broadcast service region use the same radio resource to transmit broadcast content to terminals managed by the base stations. Such a broadcast service region is defined as a MBS or E-MBS zone.

FIG. 1 shows an example of a MBS zone defined in the IEEE 802.16e and IEEE 802.16m. In the example of FIG. 1, the MBS zone is not changed after it is once configured, and base stations (for example, 19 base stations configuring a MBS zone A) belonging to a specific MBS zone always should be allocated a channel resource for MBS. Accordingly, the base stations belonging to the MBS zone A are always allocated an expensive radio resource even when there is no terminal that receives the MBS from the base stations, which results in the waste of radio resource. The waste of radio resource becomes significant in proportion to the area of the MBS is zone.

Meanwhile, a terminal has the improved quality of received signal when receiving the same signal repeatedly. As such, combining signals coming from different sectors to improve the quality of received signal is called Macro Diversity. The quality of received signal is better when the corresponding terminal stays in the center of the MBS zone than when it is located in the edge region of the MBS zone. Accordingly, in the case where a terminal stays in the edge region of a MBS zone, the Macro Diversity effect deteriorates so that the quality of received signal becomes non-uniform. Also, if a certain user moves from a MBS zone to another MBS zone, that is, as illustrated in FIG. 1, if the user moves from the MBS zone A to a MBS zone B, service disruption occurs, which may cause the user's dissatisfaction with MBS.

Meanwhile, a Korean Laid-open Patent Application No. 10-2009-0039223 discloses an apparatus and method for managing zone for MCBCS in wireless communication system.

SUMMARY

The following description relates to a technique of seamlessly changing base stations configuring a MBS zone when one or more mobile terminals configuring the MBS zone move or when a predetermined time period has elapsed to thereby provide a MBS with excellent quality while saving radio resources.

In one general aspect, there is provided a method in which a mobile terminal configures a broadcast zone to provide a broadcast service, the method including: calculating quality values of signals received from a plurality of base stations; and selecting one or more base stations that are to configure a multicast and broadcast service (MBS) zone, from among the plurality of base stations, based on the quality values of the received signals.

In another general aspect, there is provided a broadcast service system including: a terminal configured to select, when the terminal moves or when a predetermined time period elapses, one or more base stations that are to configure a Multicast Broadcast Service (MBS) zone from among a plurality of base stations, using quality values of signals received from the plurality of base stations; a base station configured to relay data transmission with the terminal and to withdraw from or subscribe in the MBS zone according to whether or not the corresponding base station is selected in the selecting of the base stations; and a gateway configured to establish a data transfer path with the base stations configuring the MBS zone.

In another general aspect, there is provided a mobile terminal including: a channel information collector configured to calculate quality values of signals received from a plurality of base stations, and to collect information about channels having signal quality values that satisfy a predetermined condition; and a Multicast Broadcast Service (MBS) zone configuration unit configured to select one or more base stations that are to configure a MBS zone from among the plurality of base stations, based on the quality values of the received signals.

In another general aspect, there is provided a serving base station including: a serving MBS zone setting unit configured to receive a Multicast and Broadcast Service (MBS) zone configuration request message from a terminal to request each member base station to participate in or withdraw from a MBS zone based on the MBS zone configuration request message, to transmit a MBS zone configuration result message including processing results indicating MBS participation and/or withdrawal of each member base station to the terminal, and to manage MBS zone status information according to the MBS zone participation and/or withdrawal of each member base station; and a serving MBS resource allocation unit configured to request a gateway to allocate a radio resource for providing a MBS required by the terminal or to release a radio resource allocated to the MBS, in order to provide the MBS according to a MBS zone configuration request from the terminal.

In another general aspect, there is provided a member base station including: a member Multicast and Broadcast Service (MBS) zone setting unit configured to receive a MBS participation and/or withdrawal request message from a serving base station to determine whether or not to participate in a MBS zone, to transmit a MBS participation and/or withdrawal result message to the serving base station, to request a gateway to transmit MBS channel information to receive the MBS channel information from the gateway, and to manage MBS zone status information according to the MBS zone participation and/or withdrawal of the member base station; and a member MBS zone allocation unit configured to request the gateway to allocate a radio resource for providing a MBS required by a terminal or to release a radio resource allocated to the MBS, in order to provide the MBS according to a MBS zone configuration request from the terminal.

Other features and aspects will be apparent from the following detailed description, the drawings, and the claims.

Figure 1:
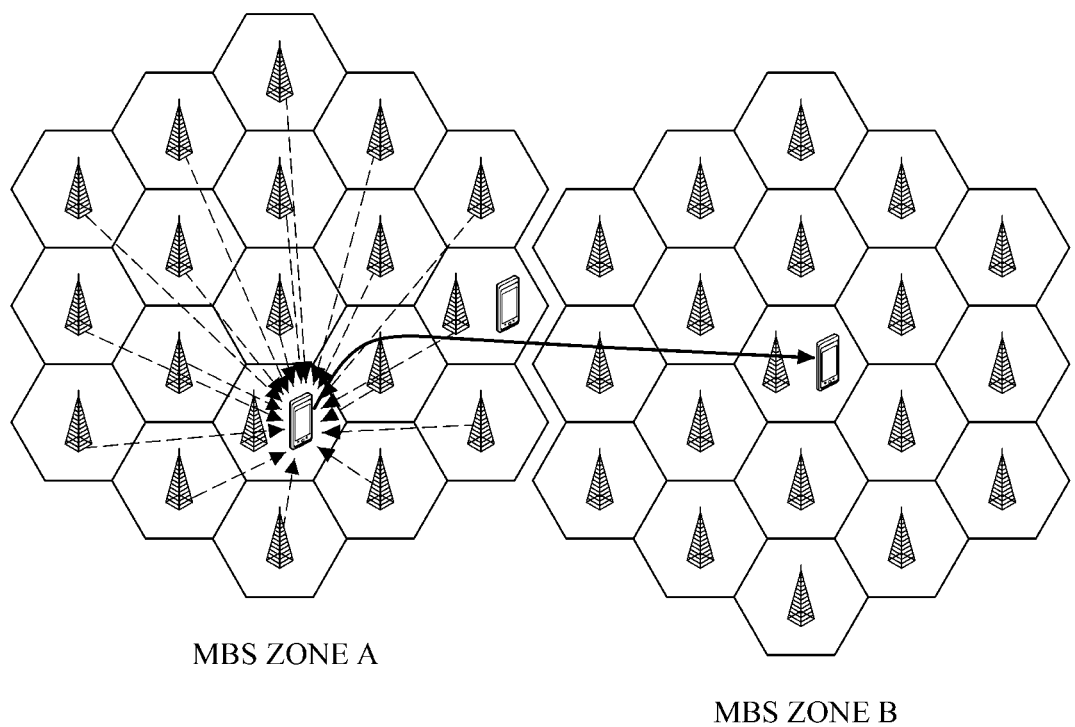
FIG. 1 shows an example of a Multicast and Broadcast Service (MBS) zone defined in the IEEE 802.16e or IEEE 802.16m.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

In a general mobile communication system, a Multicast and Broadcast Service (MBS) zone is never changed after it is once configured. However, the following description suggests a technique of configuring new MBS zones by changing base stations configuring the MBS zones when one or more terminals move or when a predetermined time period has elapsed. That is, the following description proposes a technique of configuring dynamic MBS zones. Configuring MBS zones without changing base stations configuring the MBS zones is referred to as fixed MBS-zone configuration, whereas configuring new MBS zones when one or more terminals move or when a predetermined time period has elapsed by changing base stations is configuring the MBS zones to different base stations is referred to as dynamic MBS-zone configuration. Hereinafter, a method and apparatus for dynamically configuring MBS zones will be described with reference to the attached drawings.

Figure 2:
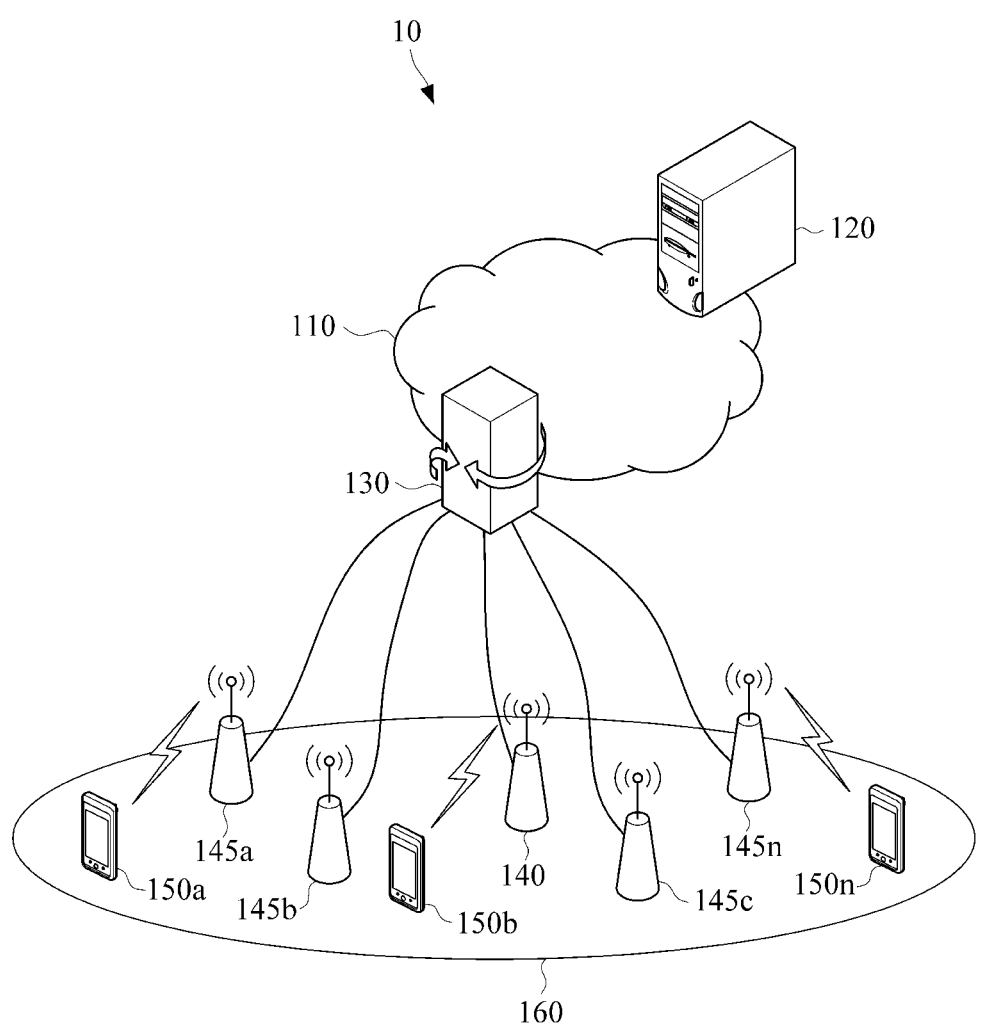
FIG. 2 shows a configuration example of a MBS mobile communication network system.

FIG. 2 illustrates a configuration example of a MBS mobile communication network system 10.

Referring to FIG. 2, the MBS mobile communication network system 10 includes a service transfer network 110, a MBS broadcast server (hereinafter, referred to as a MBS server) 120, a gateway 130, a serving base station 140, a plurality of member base stations 145a, 145b, . . . , 145n, and a plurality of mobile terminals (hereinafter, also referred to as terminals or users) 150a, 150b, . . . , 150n.

The base stations 140 and 145a through 145n distribute a radio resource to the individual terminals 150a through 150n located in a MBS zone 160 so that the terminals 150a through 150n connect to an IP network. Specifically, the base stations 140 and 145a through 140n located in the same MBS zone 160 load MBS data into the physically same radio resource and transmit it to the terminals 150a through 150n so that the terminals 150a through 150n have the effect of Macro Diversity.

The gateway 130 manages the transfer path of data when the terminals 150a through 150n transmit data to the MBS server 120 located in the service transfer network 110 through the base stations 140 and 145a through 145n or when the MBS server 120 transmits data to the terminals 150a through 150n located in the MBS zone 160. Also, the gateway 130 allocates and manages MBS zones' IDs, Multicast Channel IDs (MCIDs) for identifying radio channels used to transfer MBS content between the base stations 140 and 145a through 145n and the terminals 150a through 150n, service flows' IDs for identifying MBS service flows, and MBS data paths' IDs for identifying data paths through which MBS service data is transferred. Also, is the gateway 130 provides the base stations 140 and 145a through 145n with multicast channel information which the base stations 140 and 145a through 145n will use for MBS.

The MBS server 120 has various broadcast content that will be transferred to the terminals 150a through 150n located in the MBS zone 160. Also, the MBS server 120 manages information such that a MBS can be seamlessly provided after a new MBS zone is configured or after an existing MBS zone is changed. Here, the information that is managed by the MBS server 120 may include MBS zones' IDs, MBS contents' IDs, and multicast IP addresses of the individual MBSs. The above-mentioned information may be added or deleted depending on how a MBS is provided.

The terminals 150a through 150n are connected to the service transfer network 110 through the radio resource distributed by the base stations 140 and 145a through 145n. Then, the terminals 150a through 150n request provision of MBS, or receive a MBS being provided in the MBS zone 160 and then display the result of the reception on their screens. The service transfer network 110 connects a plurality of servers to each other for MBS.

The service transfer network 110 may include various servers, such as a broadcast (content) server, an authentication server, an Electronic Program Guide (EPG) server, etc., for provision of MBS.

Figure 3:
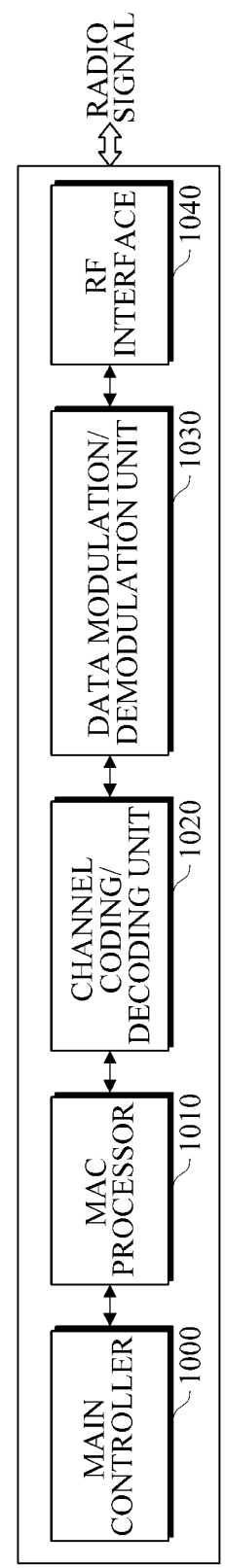
FIG. 3 is a diagram for explaining a MBS function of a terminal and a base station, wherein the MBS function is used in the MBS mobile communication network system of FIG. 2.

FIG. 3 is a diagram for explaining a MBS function of a terminal and a base station, wherein the MBS function is used in the MBS mobile communication network system of FIG. 2.

Referring to FIG. 3, a terminal or a base station includes a main controller 1000, a MAC processor 1010, a channel coding/decoding unit 1020, a data modulation/demodulation unit 1030, and an RF interface 1040, for provision of the MBS function.

The main controller 1000 processes MAC control messages and controls the main is functions of the MAC such that the MAC can perform its own functions.

The MAC processor 1010 receives data through a data path and converts the data into the format of a MAC message, or receives data through a MAC control path and converts the data into a MAC message. Then, the MAC processor 1010 transfers the MAC message to the channel coding/decoding unit 1020. Or, the MAC processor 1010 receives MAC message data from the channel coding/decoding unit 1020, deletes a MAC header from the MAC message data to extract only a data part from the MAC message data, and then loads the data part into a data path or a control path.

If the MAC processor 1010 is installed in a terminal, the MAC processor 1010 compares the qualities of signals from a base station (hereinafter, referred to as a serving base station) to which the terminal is connected, to the qualities of signals from other base stations, to search for a base station transmitting the better qualities of signals, and performs, if a base station transmitting the better qualities of signals is found, handover of connecting the terminal to the found base station. Also, the MAC processor 1010 performs scheduling for deciding an order of data that is to be transmitted to the base station. In addition, the MAC processor 1010 is in charge of resource management for requesting radio resources needed for data transmission, and service connection between the terminal and base station.

If the MAC processor 1010 is installed in a base station, like when the MAC processor 1010 is installed in a terminal, the MAC processor 1010 converts data that will be transmitted to a terminal into the format of a MAC message, or deletes a MAC header from data received from a terminal and then transmits only a data part through a data path or a control path. Also, the MAC processor 1010 performs handover together with the terminal, scheduling of deciding an order of data that is to be transmitted to the terminal, and distribution of radio resources to the terminal.

The channel coding/decoding unit 1020 performs a series of channel coding process of inserting a CRC value to data that is to be transmitted in a wireless manner, scrambling the resultant data, and then performing channel encoding and interleaving. Also, the channel coding/decoding unit 1020 performs a series of channel decoding process of performing deinterleaving on data that has been loaded in a physical channel and transmitted by the data modulation/demodulation unit 1030, performing channel decoding and descrambling and then extracting a CRC bit from the resultant data.

The data modulation/demodulation unit 1030 performs a series of data modulation process of converting data received from the channel coding/decoding unit 1020 into a transmission symbol according to an Adaptive Modulation and Coding (AMC) value, converts the transmission symbol into an Orthogonal Frequency Division Multiplex (OFDM) signal, and then transmitting the OFDM signal to the RF interface 1040. Also, the data modulation/demodulation unit 1030 performs a series of data demodulation process of demodulating OFDM data received from the RF interface 1040 to a symbol value created by the terminal or base station, measuring the quality of the received signal, and generating an encoded data stream from the symbol value.

The RF interface 1040 converts radio signals into I/Q signals that can be dealt by a base band, using an Analog to Digital Converter (ADC), or I/Q signals into radio signals using a Digital to Analog Converter (DAC).

Figure 4:
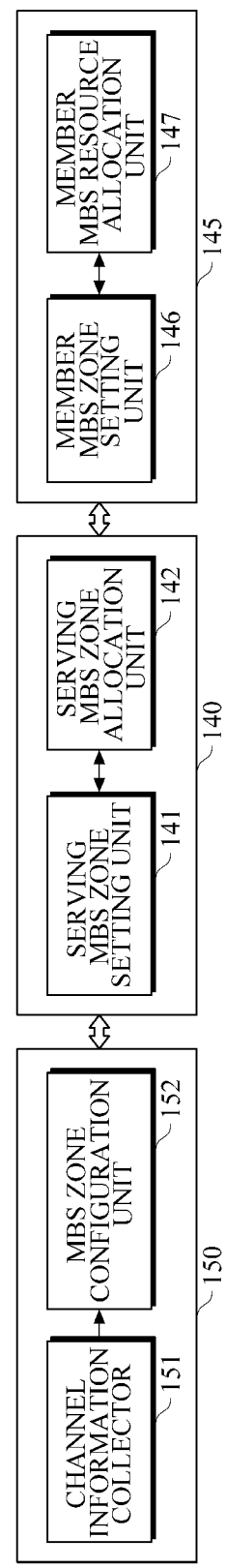
FIG. 4 is a diagram for explaining a process for dynamically managing MBS zones such that MACs of terminals and base stations configure MBS zones dynamically.

FIG. 4 is a diagram for explaining a process for dynamically managing a MBS zone such that MACs of terminals and base stations configure or change a MBS zone dynamically.

Referring to FIG. 4, for a function for dynamic management of MBS zones, a terminal 150 includes a channel information collector 151 and a MBS zone configuration unit 152, a serving base station 140 includes a serving MBS zone setting unit 141 and a serving MBS is resource allocation unit 142, and a member base station 145 includes a member MBS zone setting unit 146 and a member MBS resource allocation unit 147.

Referring to FIGS. 2, 3 and 4, the function for dynamic management of MBS zones is associated with the function of the MAC processor 1010 to check the quality values of signals received from the base stations 140 and 154 and process handover, among various functions of MACs of the terminal 150 and base stations 140 and 145. Therefore, the function for dynamic management of MBS zones also will be able to show most excellent performance in the MAC processor 1010.

The channel information collector 151 of the terminal 150 collects the quality values of signals received through various radio channels, and arranges or classifies the corresponding data according to a predetermined rule. The MBS zone configuration unit 152 configures new MBS zones or changes the existing MBS zones based on values generated by the channel information collector 151.

The serving MBS zone setting unit 141 of the serving base station 140 and the member MBS zone setting unit 146 of the member base station 145 subscribe/withdraw the base stations 140 and 145 themselves in/from the MBS zones based on information about MBS zones generated by and transmitted from the terminal 150, set/release information for providing a MBS, and transmit the information about MBS zones to the peripheral base stations, or receive setting information about MBS zones from the peripheral base stations and transmit the setting information about MBS zones to the terminal 150. The serving MBS resource allocator 142 and the member MBS resource allocation unit 147 allocate radio resources for providing the MBA.

Hereinafter, a method in which the channel information collector 151 and MBS zone configuration unit 152 of the terminal 150, the serving MBS zone setting unit 141 and serving MBS resource allocator 142 of the serving base station 140, and the member MBS zone setting is unit 146 and member MBS resource allocation unit 147 of the member base station 145 configure MBS zones dynamically will be described in detail.

The channel information collector 151 of the terminal 150 arranges the quality values of received signals in a descending/ascending order, wherein the quality values of received signals are ranked in correspondence to individual base stations by the RF interface 1040, the data modulation/demodulation unit 1030, or the channel decoding unit 1020. The quality value of each received signal may be Received Signal Strength Indication (RSSI), Signal to Interference plus Noise Ratio (SINR), or Signal to Noise Ratio (SNR).

The MBS zone configuration unit 152 selects base stations that will provide a MBS requested by the terminal 150 from among peripheral base stations including the serving base station 140, and configures a zone (or a region) consisting of the selected base stations. According to an example, the MBS zone configuration unit 152 configures a MBS zone just after the terminal 150 is power on or after the terminal 150 performs handover. Thereafter, the MBS zone configuration unit 152 may configure a new MBS zone whenever a predetermined time period elapses.

Member base stations belonging to the newly configured MBS zone may be identical to or different from member base stations belonging to the previous MBS zone. In this specification, changing MBS zones whenever the terminal 150 performs handover or whenever a predetermined time period elapses is referred to as dynamic MBS zone (D-MBS) configuration, and the base stations configuring the D-MBS zone are referred to as MBS member base stations (or MBS members).

The MBS zone configuration unit 152 transmits information about members of a D-MBS zone to the serving base station 140 only when member base stations of the newly configured D-MBS zone are different from member base stations of the previous MBS zone. At this time, the is information about the members of the D-MBS zone may be IDs of base stations that are newly added or excluded or IDs of all MBS member base stations belonging to the newly configured D-MBS zone.

The MBS zone configuration unit 152 transmits a MBS zone configuration request message to the serving base station 140. The MBS zone configuration request message may include IDs of MBS member base stations that are newly added to or excluded from a MBS zone that will be newly configured, values indicating whether the individual MBS member base stations will be newly added to or excluded from the newly configured MBS zone, MBS program IDs, and IDs of terminals that request MBS zone configuration.

The MBS zone configuration unit 152 may select members having relatively great RSSI or SINR values or from which RSSI or SINR values are greater than a predetermined value, as D-MBS zone members. The MBS zone configuration unit 152 receives a response to the D-MBS zone configuration request from the serving base station 140. In other words, the MBS zone configuration unit 152 receives information about whether or not the MBS member base stations 145 participate in MBS, from the serving base station 140. Then, a MBS information table configuration unit of the terminal 150 may configure a terminal MBS information table to determine whether the MBS member base station 145 is changed whenever a D-MBS zone is newly configured.

The serving base station 140 secures, when receiving a D-MBS zone configuration request message from the terminal 150, a radio resource that will be used for MBS through the serving MBS resource allocation unit 142. Specifically, in order to enhance MBS quality by reducing a time consumed for handover when the terminal 150 moves between cells in a D-MBS zone, the MBS zone setting units 141 and 146 and MBS resource allocation units 146 and 147 of is the serving base station 140 and all the MBS member base stations 145 secure radio channels having the same characteristics. For this, the serving base station 140 and the MBS member base stations 145 receive a MCID for identifying a radio channel (hereinafter, referred to as a MBS channel) used for connecting to a MBS required by the terminal 150, an ID of the corresponding MBS zone, physical parameter values about the MBS channel, through the gateway 130 and the MBS server 120. In the following description, the above-mentioned values are referred to as MBS channel information.

Meanwhile, the serving base station 140 and the MBS member base station 145 transmit a MBS channel information request message to the gateway. The MBS channel information request message includes a value indicating a request for MBS channel information, a MBS program ID, and the IDs of the base stations that are transmitting the message. Then, the gateway includes channel information about the requested MBS program in a MBS channel information response message, and transmits the MBS channel information response message to the serving base station 140 or the MBS member base station 145.

The serving base station 140 which has received the MBS channel information transmits a MBS participation and/or withdrawal request message to the MBS member base station 145 to request the MBS member base station 145 to participate in or withdraw from MBS setting. The MBS participation and/or withdrawal request message includes a value indicating MBS participation and/or withdrawal, the IDs of terminals that want to participate in or withdraw from MBS, and a MBS program ID.

If the MBS member base station 145 receives a MBS withdrawal request message from a certain terminal, the MBS member base station 145 reflects information about MBS withdrawal of the terminal to a base station MBS information table that stores MBS information. If no terminal wants to receive a MBS, the MBS member base station 145 withdraws the corresponding MBS channel and deletes content regarding the MBS channel from the base station MBS information table. Then, the MBS member base station 145 transmits a MBS channel release request message to the gateway 130 to thereby inform that the MBS member base station 145 has withdrawn from the MBS channel. The MBS channel release request message includes a value indicating that the MBS channel has been withdrawn, a MBS program ID, and the ID of the MBS member base station 145.

Meanwhile, if the MBS member base station 145 receives a MBS participation request message from a certain terminal, the MBS member base station 145 determines whether a MBS required by the terminal is already being provided. If a MBS required by the terminal is already being provided by the MBS member base station 145, the MBS member base station 145 reflects the terminal's ID to MBS program IDs and MBS channel information-related values of the corresponding MBS information table. However, if the MBS required by the terminal is not provided, the member MBS resource allocation unit 146 of the MBS member base station 145 determines whether a MBS channel for the MBS can be prepared. If a MBS channel for the MBS can be prepared, the member MBS resource allocation unit 147 prepares a MBS channel, loads, when MBS data is received, the MBS data in the MBS channel, and then transmits the MBS channel to the terminal. In addition, the terminal's ID, information about the requested MBS, a MBS program ID, and values related to the MBS channel are stored in the MBS information table.

The MBS member base station 145 may acquire MBS channel information using various methods. According to an example, the serving base station 140 receives MBS channel information from the gateway 130 and the MBS server 120. Then, the serving base station 140 includes, when transmitting a MBS participation and/or withdrawal request message to the MBS member base station 145, the MBS channel information in the MBS participation and/or is withdrawal request message and transmits the resultant MBS participation and/or withdrawal request message to the MBS member base station 145. Then, the MBS member base station 145 receives the MBS participation and/or withdrawal request message and reads the MBS channel information from the MBS participation and/or withdrawal request message to use it. According to another example, the MBS member base station 145 which has received the MBS participation and/or withdrawal request message acquires the MBS channel information directly from the gateway 130 and the MBS server 120.

Meanwhile, when the MBS member base station 145 terminates processing for MBS participation and/or withdrawal requested by the terminal, the MBS member base station 145 transmits a MBS participation and/or withdrawal result message to the serving base station 140. The MBS participation and/or withdrawal result message includes a value indicating the result of the processing related to the MBS participation and/or withdrawal request, and the ID of the terminal that has requested MBS participation and/or withdrawal.

Then, the serving base station 140 generates a MBS zone configuration result message and transmits it to the terminal 150. The MBS zone configuration result message includes a MBS program ID, and a value indicating the result of the processing related to MBS participation and/or withdrawal of the MBS member base station 145, the result of the processing included in the MBS participation and/or withdrawal result message transmitted from the MBS member base station 145.

Figure 5:
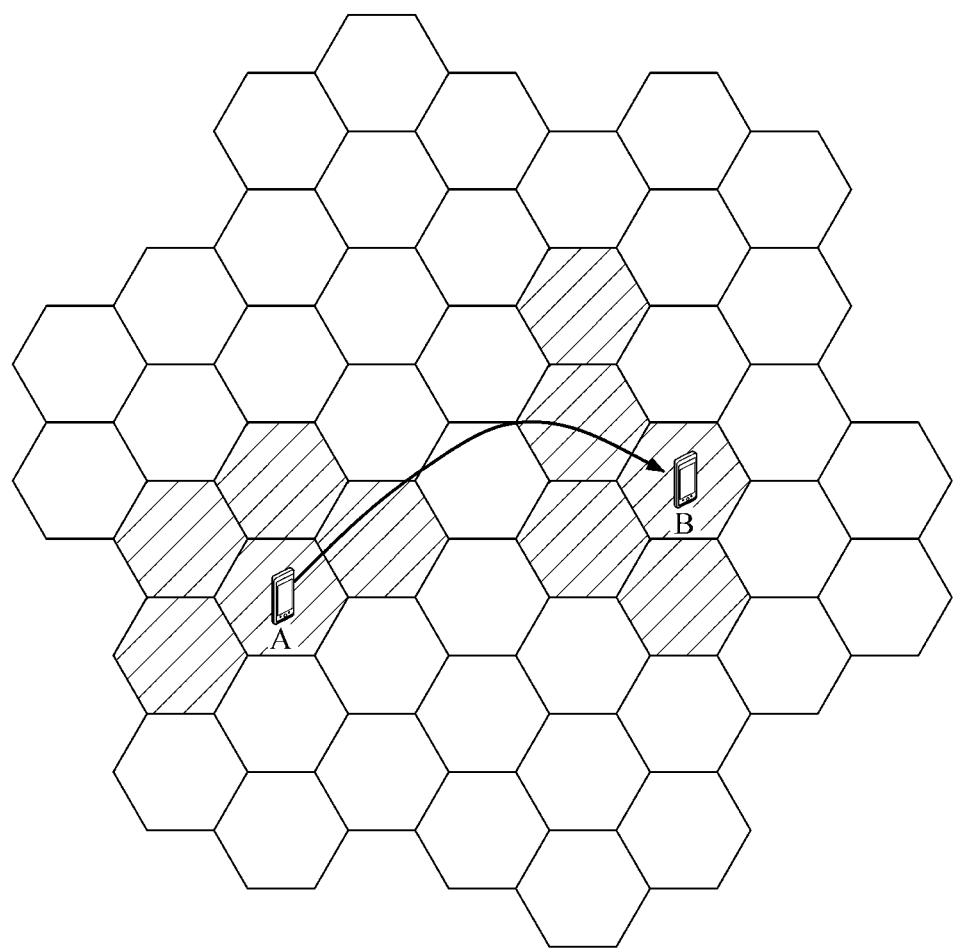
FIG. 5 is a view for explaining dynamic MBS zones configured according to a dynamic MBS zone configuration function of terminals and base stations.

FIG. 5 is a view for explaining dynamic MBS zones configured according to a dynamic MBS zone configuration function of terminals and base stations.

FIG. 5 shows MBS zones where base stations covering oblique-lined areas A and B, respectively, are dynamically configured. Referring to FIG. 5, it is seen that a MBS zone configured when a terminal is located in a cell A is different from a MBS zone configured when is a terminal is located in a cell B. Also, it can be seen that each MBS zone is configured with only base stations located near the terminal. However, this does not mean that each MBS zone is configured with base stations located closest to the terminal.

Figure 6:
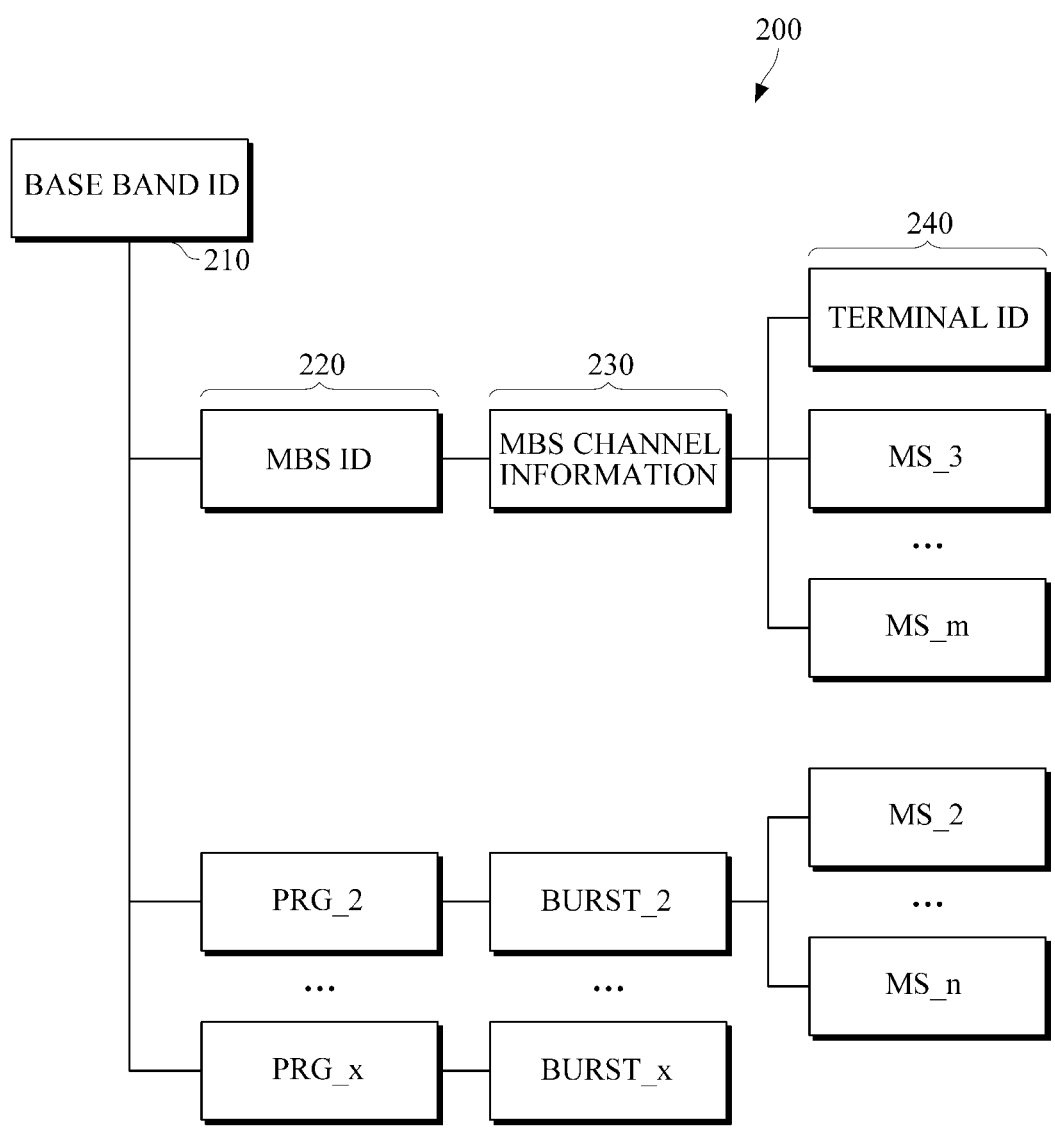
FIG. 6 shows an example of a MBS information table of a base station.

FIG. 6 shows an example of a MBS information table 200 of a base station.

Referring to FIG. 6, in the MBS information table 200, BS_x 210 represents a base station ID, and PRG_x 220 represents the IDs of MBS programs that are dealt with by the base station. BURST_x 230 is a MBS channel information value representing the physical characteristic of a MBS channel, and may depend on a MBS-related mobile communication standard, such as the IEEE 802.16e, IEEE802.16m, 3GPP/LTE, etc. For example, the IEEE 802.16m uses MCIDs, the IDs of MBS zones, the number of sub channels, the number of OFDM symbols, the offsets of OFDM symbols, the offsets of sub channels, etc., as MBS channel information, for provision of MBS. In the current example, the BURST_x 230 may be configured with parameters configuring MBS_MAP or MBS_MAP_IE defined in the Mobile WiMAX Forum, IEEE 802.16e or IEEE 802.16m, however, this is not limited. Also, MS_x 240 is IDs of terminals that are using a specific MBS program.

Figure 7:
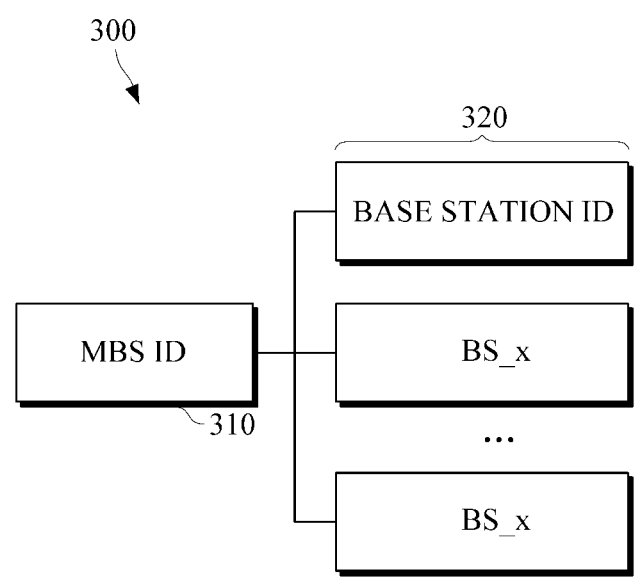
FIG. 7 shows an example of a MBS information table of a terminal.

FIG. 7 shows an example of a MBS information table 300 of a terminal.

Referring to FIG. 7, in the MBS information 300, PRG_x 310 is the IDs of MBS programs that are dealt with by base stations, and BS_x 320 is the IDs of the base stations.

Figure 8:
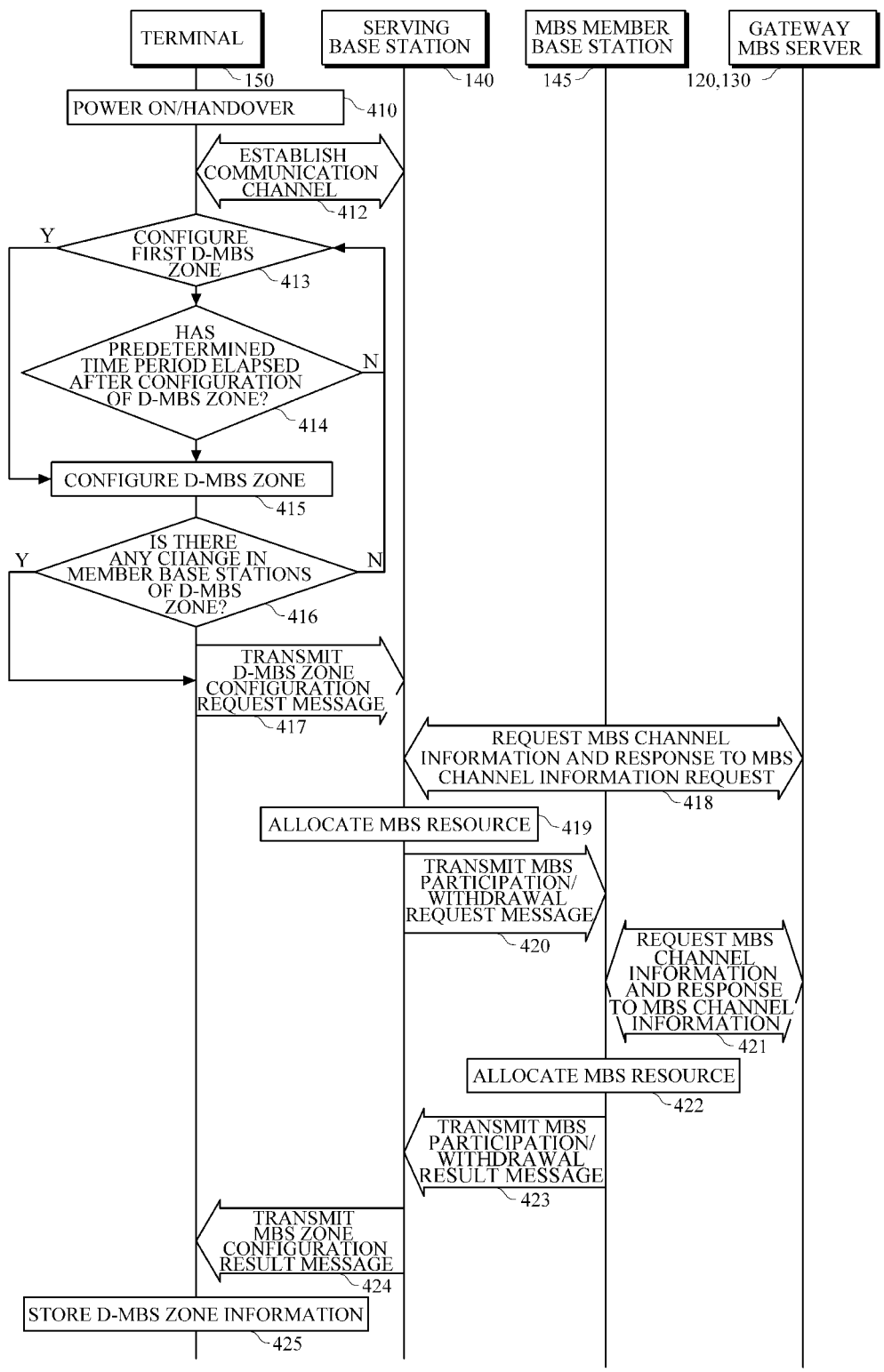
FIG. 8 is a flowchart illustrating an example of a broadcast zone configuration method for providing a MBS.

FIG. 8 is a flowchart illustrating an example of a broadcast zone configuration method for providing a MBS.

Referring to FIGS. 4 and 8, when a terminal 150 is initially power on or just after the terminal 150 performs handover (410), the terminal 150 and the serving base station 140 establishes a communication channel therebetween according to the specification of a mobile communication system which they use (412).

Then, the terminal 150 configures a first D-MBS zone consisting of the serving base station 140 and several neighboring base stations (413 and 415). At this time, the terminal 150 selects at least one MBS member base station 145 configuring the D-MBS zone, based on the quality values of signals received from the neighboring base stations. The terminal 150 may select a plurality of MBS member base stations 145 in the descending order of the quality values of the received signals from a base station that has transmitted a most excellent quality of signal. Or, the terminal 150 may select ones from among base stations from which signal quality values exceed a predetermined value. Or, the terminal 150 may select ones located close to the serving base station 140 from among base stations from which signal quality values exceed a predetermined value.

Successively, the terminal 150 compares the member base stations of the newly configured D-MBS zone to member base stations of the previously configured D-MBS zone, and if the newly configured D-MBS zone includes at least one member base station that is identical to none of the member base stations of the previously configured D-MBS zone (416), the terminal 150 transmits a MBS zone configuration request message to the serving base station 140 (417). The MBS zone configuration request message may include the terminal's ID and the ID of a MBS program required by the terminal 150.

The serving MBS zone setting unit 141 (see FIG. 4) of the serving base station 140 reads the IDs of the D-MBS member base stations, the ID of the MBS program, and the terminal's ID from the MBS zone configuration request message. The serving MBS zone setting unit 141 determines whether the ID of a MBS program required by the terminal 150 having transmitted the MBS zone configuration request message has been stored in a MBS information table in order to check whether a MBS required by the terminal 150 is already being provided.

If the ID of the MBS program is found in the MBS information table, the serving MBS is zone setting unit 141 determines that the MBS required by the terminal 150 is already being provided, and if the ID of the MBS program is not found in the MBS information table, the serving MBS zone setting unit 141 determines that the MBS required by the terminal 150 has to be initially provided by the serving base station 140.

In detail, if the MBS required by the terminal 150 is already being provided, the serving MBS zone setting unit 141 stores an ID of the terminal 150 that has transmitted the MBS zone configuration request message in the base station MBS information table, whereas if the MBS required by the terminal 150 is new one, the serving MBS zone setting unit 141 receives MBS channel information for processing a MBS channel that will be used to provide the corresponding MBS, from the gateway 130 (418).

Then, the serving MBS resource allocation unit 142 (see FIG. 4) of the serving base station 140 determines whether the serving MBS resource allocation unit 142 can allocate a MBS channel according to the MBS channel information provided by the gateway 130 (419). The serving MBS zone setting unit 141 stores, only when the serving MBS resource allocation unit 142 can acquire a MBS channel for the MBS required by the terminal 150, the ID of the terminal 150 having transmitted the MBS zone configuration request message, the ID of the MBS program, and the MBS channel information in the base station MBS information table.

Successively, the serving base station 140 transmits a MBS participation and/or withdrawal request message to the MBS member base station 145 (420). The terminal 150 may include the MBS channel information and details information about the MBS program in the MBS participation and/or withdrawal message. Also, if a specific member base station has to be withdrawn from the MBS according to the MBS zone configuration request message, the serving MBS zone setting unit 141 transmits a MBS withdrawal request message to the member base station.

The member MBS zone setting unit 146 (see FIG. 4) of the member base station 145 determines whether the ID of the MBS program required by the terminal 150 has already been stored in the base MBS information table in order to check whether the MBS required by the terminal 150 is already being provided. If the ID of the MBS program is found in the base station MBS information table, the member MBS zone setting unit 146 determines that the MBS is already being provided by the member base station 145. On the contrary, if the ID of the MBS program is not found in the base station MBS information table, the MBS has to be initially provided by the member base station 145.

In the case where the MBS is already being provided by the member base station 145, the member MBS zone setting unit 146 stores the ID of the terminal 150 in the base station MBS information table. However, if the MBS is new one, the member base station 145 acquires MBS channel information for processing a MBS channel that will be used to process the MBS required by the terminal 150, and details information about the MBS program, from the MBS participation and/or withdrawal request message received from the serving base station 140. Alternatively, the member base station 145 receives MBS channel information and details information about the MBS program from the gateway 130 and the MBS server 120 (421).

Then, the member MBS resource allocation unit 147 (see FIG. 4) of the member base station 145 determines whether the member MBS resource allocation unit 147 can prepare the MBS channel based on the MBS channel information (422). At this time, the member MBS zone setting unit 146 stores, only when the member MBS resource allocation unit 147 can acquire a MBS channel for providing the MBS required by the terminal 150, the ID of the terminal 150, the ID of the MBS program, and the MBS channel information in the base station MBS information table.

Successively, the member base station 145 transmits a MBS participation and/or withdrawal result message to the serving base station 140 in response to the MBS participation and/or withdrawal request message (423). Also, if the member MBS zone setting unit 146 receives a MBS withdrawal request message, the member MBS zone setting unit 146 deletes a terminal ID included in the MBS withdrawal request message from the base station MBS information table stored in the member base station 145, and searches for any terminal that uses the same MBS program from the base station MBS information table. If no terminal that uses the same MBS program is found in the base station MBS information table, the member MBS zone setting unit 146 informs the fact of the member MBS resource allocation unit 147 so as to stop using the MBS channel, and transmits a MBS channel information request message to the gateway 130 so as to inform that the corresponding MBS channel is empty.

Also, in response to a MBS withdrawal request, the member base station 145 transmits a MBS withdrawal result message to the serving base station 140 that has transmitted the MBS withdrawal request message (423). The serving base station 140 receives the MBS participation and/or withdrawal result message transmitted by the MBS member base station 145, and reads a value indicating MBS participation and/or withdrawal from the MBS participation and/or withdrawal result message. Then, the serving base station 140 generates a MBS zone result message consisting of the value and the ID of the MBS program and transmits the MBS zone result message to the terminal 150 that has transmitted the D-MBS zone configuration request message (424).

The terminal 150 receives the MBS zone configuration result message from the serving base station 140, and reads a value indicating MBS participation and/or withdrawal of each member base station 145 from the MBS zone configuration result message. If the read value indicates MBS participation of the member base station 145, the terminal 150 stores the ID of the member base station 145 in the terminal MBS information table (425). Meanwhile, if the read is value indicates MBS withdrawal of the member base station 145, the terminal 150 deletes the ID of the member base station 145 from the terminal MBS information table. D-MBS zone member base station information configured in this way is compared to information about member base stations belonging to a D-MBS zone that is newly configured by the terminal 150, and used to check whether a MBS member base station(s) is changed.

Hereinafter, a D-MBS zone configuration method according to another example will be described in detail. The D-MBS zone configuration method relates to a method of adding a new member base station to an existing D-MBS zone or of excluding a member base station from the D-MBS zone.

Referring to FIGS. 4 and 8, the terminal 150 receives a MBS through a communication channel and a D-MBS member base station. The MBS zone configuration unit 152 of the terminal 150 configures a D-MBS zone at predetermined time intervals (414 and 415). At this time, the terminal 150 selects MBS member base stations (145 for each) that will configure a D-MBS zone, using the quality values of signals from base stations. The terminal 150 may select a plurality of MBS member base stations 145 in the descending order of the quality values of the received signals from a base station that has transmitted a most excellent quality of signal. Or, the terminal 150 may select ones from among base stations from which signal quality values exceed a predetermined value. Or, the terminal 150 may select ones located close to the serving base station 140 from among base stations from which signal quality values exceed a predetermined value.

Successively, the terminal 150 compares the member base stations of the newly configured D-MBS zone to member base stations of the previously configured D-MBS zone, and if the newly configured D-MBS zone includes at least one member base station that is identical is to none of the member base stations of the previously configured D-MBS zone (416), the terminal 150 transmits a MBS zone configuration request message to the serving base station 140 (417). The MBS zone configuration request message may include the terminal's ID and the ID of a MBS program required by the terminal 150.

The serving MBS zone setting unit 141 of the serving base station reads the IDs of D-MBS member base stations, the ID of a MBS program, and the ID of the terminal 150 from the MBS zone configuration request message. The serving MBS zone setting unit 141 checks whether the ID of a MBS program required by the terminal 150 is stored in a base station MBS information table in order to determine whether a MBS required by the terminal 150 is already being provided. If the ID of the MBS program is found in the base station MBS information table, the serving MBS zone setting unit 141 determines that the MBS is already being provided by the serving base station 140. On the contrary, if the ID of the MBS program is not found in the base station MBS information table, the serving MBS zone setting unit 141 determines that the MBS has to be initially provided by the serving base station 140.

If the MBS is already being provided by the serving base station 140, the serving MBS zone setting unit 141 stores the ID of the terminal 150 that has transmitted the MBS zone configuration request message in the base station MBS information table. On the contrary, if the MBS required by the terminal 150 is new one, the serving MBS zone setting unit 141 receives (418) receives MBS channel information for processing a MBS channel that will be used to provide the MBS, and details information about the MBS program, from the gateway 130 and the MBS server 120 (418).

Then, the serving MBS resource allocation unit 142 determines whether the serving MBS resource allocation unit 142 can prepare the MBS channel based on the MBS channel information received from the gateway 130 (419). At this time, the serving MBS zone setting unit 141 stores, only when the serving MBS resource allocation unit 142 can acquire a MBS channel for the MBS required by the terminal 150, the ID of the terminal 150, the ID of the MBS program, and the MBS channel information in the base station MBS information table.

Successively, the serving base station 140 transmits a MBS participation and/or withdrawal request message to the MBS member base station 145 (420). At this time, the terminal 150 may include the MBS channel information and details information about the MBS program, received from the gateway 130 and the MBS server 120, in the MBS participation and/or withdrawal request message. Also, if a specific member base station has to be withdrawn from the MBS according to the MBS zone configuration request message, the serving MBS zone setting unit 141 transmits a MBS withdrawal request message to the corresponding member base station.

The member MBS zone setting unit 146 reads, if receiving a MBS participation and/or withdrawal request message from the serving base station 140, the ID of the terminal 150 and the ID of the MBS program from the MBS participation and/or withdrawal request message. Then, the member MBS zone setting unit 146 also reads MBS channel information from the received MBS participation and/or withdrawal request message if the MBS channel information exists in the MBS participation and/or withdrawal request message.

The member MBS zone setting unit 146 checks whether the ID of the MBS program required by the terminal 150 is included in the base station MBS information table in order to determine whether the MBS required by the terminal 150 is already being provided. If the ID of the MBS program is found in the base station MBS information table, the member MBS zone setting unit 146 determines that the MBS is already being provided by the member base station 145. However, if the ID of the MBS program is not found in the base station MBS information table, the member MBS zone setting unit 146 determines that the MBS has to be initially provided by the member base station 145.

In the case where the MBS required by the terminal 150 is already being provided, the member MSB zone setting unit 146 stores the ID of the terminal 150 in the base station MBS information table. However, if the MBS is new one, the member base station 145 acquires MBS channel information for processing a MBS channel that will be used to provide the MBS, and details information about the MBS program, from the MBS participation and/or withdrawal request message received from the serving base station 140. Or, the member base station 145 receives MBS channel information and details information about the MBS program from the gateway 130 and the MBS server 120 (421).

Successively, the member MBS resource allocation unit 147 determines whether the member MBS resource allocation unit 147 can prepare a MBS channel according to the MBS channel information (422). At this time, the member MBS zone setting unit 146 stores, only when the member MBS resource allocation unit 147 can acquire a MBS channel for the MBS required by the terminal 150, the ID of the terminal 150, the ID of the MBS program, and the MBS channel information in the base station MBS information table.

Then, the member base station 145 transmits a MBS participation and/or withdrawal result message to the serving base station 140 in response to the MBS participation and/or withdrawal request message (423). Also, the member MBS zone setting unit 146 deletes, when receiving a MBS withdrawal request message, a terminal ID included in the MBS withdrawal request message from the base station MBS information table stored in the member base station 145, and then searches for any terminal that uses the same MBS program from the base station MBS information table. Then, if no terminal using the same MBS program is found in the base station MBS information table, the member MBS zone setting unit 146 informs the member MBS resource allocation unit 147 of the fact that no terminal using the same MBS program has been found to stop using the MBS channel, and also the member MBS zone setting unit 146 transmits a MBS channel information request message to the gateway 130 to inform that the corresponding MBS channel is empty.

Then, the member MBS zone setting unit 146 transmits a MBS withdrawal result message to the serving base station 140 that has transmitted the MBS withdrawal request message (423). The serving base station 140 receives the MBS participation and/or withdrawal result message from each MBS member base station, and reads a value indicating MBS participation and/or withdrawal from the MBS participation and/or withdrawal result message. Then, the serving base station 140 generates a MBS zone configuration result message consisting of the read value and the ID of the MBS program and transmits the MBS zone configuration result message to the terminal 150 that has transmitted the D-MBS zone configuration request message.

The terminal 150 receives the MBS zone configuration result message from the serving base station 140, and then reads a value indicating MBS participation and/or withdrawal of each member base station 145 from the MBS zone configuration result message. If the read value indicates MBS participation of the member base station 145, the terminal 150 stores the ID of the member base station 145 in a terminal MBS information table of the terminal 150 (425). If the read value indicates MBS withdrawal of the member base station 145, the terminal 150 deletes the ID of the member base station 145 from the terminal MBS information table. D-MBS zone member base station information configured in this way is compared to information about member base stations of a D-MBS zone newly configured by the terminal 150, and used to check whether any MBS member base station is changed.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method in which a mobile terminal configures a broadcast zone to provide a broadcast service, the method comprising:
    calculating quality values of signals received from a plurality of base stations by a channel information collector; and
    selecting by a Multicast Broadcast Service (MBS) zone configuration unit one or more base stations that are to configure a multicast and broadcast service (MBS) zone, from among the plurality of base stations, based on the quality values of the received signals,
    receiving information about member base stations that participate in a MBS zone, MBS program information and MBS channel information from a MBS server and a gateway;
    configuring a MBS information table including the information about the member base stations and the MBS program information by a terminal MBS information table configuration unit,
    comparing information about the member base stations belonging to a newly configured MBS zone to information about the member base stations belonging to a previously configured MBS zone by the MBS zone configuration unit, and
    transmitting, if the newly configured MBS zone includes at least one member base station that is identical to none of the member base stations of the previously configured MBS zone, a MBS zone configuration request message to the serving base station.

2. The method of claim 1, wherein the base stations that are to configure the MBS zone and the number of the base stations are seamlessly changed dynamically whenever the mobile terminal moves or whenever a predetermined time period elapses.

3. The method of claim 1, wherein the quality values of the received signals are calculated using at least one of the RSSI and SINR values, and
    the selecting of the base stations comprises selecting one or more base stations from which signal quality values are higher ranked than the other signal quality values, selecting one or more base stations from which signal quality values exceed a predetermined value, or selecting one or more base stations located at a distance from the serving base station.

4. A broadcast service system comprising:
    a terminal configured to select, when the terminal moves or when a predetermined time period elapses, one or more base stations that are to configure a Multicast Broadcast Service (MBS) zone from among a plurality of base stations, using quality values of signals received from the plurality of base stations;
    a terminal MBS information table configuration unit configured to receive information about member base stations that participate in a MBS zone, to receive MBS program information and MBS channel information from a MBS server and a gateway, and configure an MBS information table including the information about the member base stations and the MBS program information;
    an MBS zone configuration unit is configured to compare the information about the member base stations belonging to a newly configured MBS zone to information about the member base stations belonging to a previously configured MBS zone and transmit, if the newly configured MBS zone includes at least one member base station that is identical to none of the member base stations of the previously configured MBS zone, a MBS zone configuration request message to the serving base station;
    a base station configured to relay data transmission with the terminal and to withdraw from or subscribe in the MBS zone according to whether or not the corresponding base station is selected in the selecting of the base stations; and
    a gateway configured to establish a data transfer path with the base stations configuring the MBS zone.

5. A mobile terminal comprising:
    a channel information collector configured to calculate quality values of signals received from a plurality of base stations, and to collect information about channels having signal quality values that satisfy a predetermined condition; and
    a Multicast Broadcast Service (MBS) zone configuration unit configured to select one or more base stations that are to configure a MBS zone from among the plurality of base stations, based on the quality values of the received signals, and
    compare information about member base stations belonging to a newly configured MBS zone to information about member base stations belonging to a previously configured MBS zone, and transmits, if the newly configured MBS zone includes at least one member base station that is identical to none of the member base stations of the previously configured MBS zone, a MBS zone configuration request message to the serving base station; and
    a terminal MBS information table configuration unit configured to receive information about member base stations that participate in a MBS zone, to receive MBS program information and MBS channel information from a MBS server and a gateway, and to configure an MBS information table including the information about the member base stations and MBS program information.

6. The mobile terminal of claim 5, wherein the channel information collector collects information about channels having signal quality values that correspond to at least one condition of: whether the signal quality values are higher ranked than the other signal quality values; whether the signal quality values exceed a predetermined value; and whether the corresponding signals have been received from one or more member base stations located at a distance from the serving base station.

7. The mobile terminal of claim 5, wherein the MBS zone configuration unit configures the MBS zone in a predetermined time period after the terminal is powered on or after the terminal performs handover between cells, and after the MBS zone is configured, the MBS zone configuration unit reconfigures the MBS zone whenever the predetermined time period elapses.

8. The mobile terminal of claim 5, wherein the MBS zone configuration request message includes IDs of member base stations that participate in or withdraw from the newly configured MBS zone, values indicating whether or not the member base stations participate in the newly configured MBS zone, an ID of a MBS program, and an ID of a terminal that requests configuration of a MBS zone.

9. The mobile terminal of claim 5, wherein the MBS zone configuration unit receives a processing result of each member base station from the serving base station in response to a MBS zone setting request transmitted from the serving base station to the member base station, and transmits a MBS zone configuration result message to the terminal according to the received processing result to add IDs of one or more base stations that participate in the MBS zone to the MBS information table and delete IDs of one or more base stations that withdraw from the MBS zone from the MBS information table based on the received processing result.

* * * * *